United States Patent [19]
Levenberg

[11] 3,851,910
[45] Dec. 3, 1974

[54] AUTOMOTIVE BUMPER AND ENERGY ABSORBING MEMBER THEREFOR

[76] Inventor: Nathan Levenberg, 2 Windsor Place, Lynbrook, N.Y. 11561

[22] Filed: Apr. 10, 1973

[21] Appl. No.: 349,720

[52] U.S. Cl. ............... 293/89, 293/99, 188/1 B, 267/9 C
[51] Int. Cl. .................. B60r 19/04, F16f 1/36
[58] Field of Search ........... 188/1 B, 1 C; 267/9 C 293/1;70;89;99

[56] References Cited
UNITED STATES PATENTS

| | | | |
|---|---|---|---|
| 1,299,315 | 4/1919 | Faget | 293/99 |
| 1,334,247 | 3/1920 | Killian | 267/9 C |
| 1,358,965 | 11/1920 | McGregor | 293/99 |
| 2,819,063 | 1/1958 | Neidhart | 188/1 C |
| 3,583,530 | 6/1971 | De Venne | 293/70 |

Primary Examiner—M. Henson Wood, Jr.
Assistant Examiner—Robert Saifer
Attorney, Agent, or Firm—Lane, Aitken, Dunner & Ziems

[57] ABSTRACT

An energy-absorbing member for use, for example, in combination with an automobile bumper system wherein the member defines an opening having a first portion for accommodating a translatable member and a second portion defining a pair of opposed surfaces for frictionally engaging the periphery of the translating member. In one embodiment, the distance between the opposed surfaces of the opening decreases with increasing distance from the first portion of the opening, while the surfaces may be linear or curvilinear. In another embodiment, the thickness of the member increases with increasing distance from the first portion of the opening to impart an increasing frictional engagement with the translatable member so that the distance between the opposed surfaces of the opening may be varying or non-varying. Additional openings may also be provided in the member to increase the compressibility of the member. In a preferred combination, the energy-absorbing member is used in combination with a bumper secured by a fastening member to a spring arm in such a manner that the spring arm is laterally translatable relative to the bumper upon impact. By securing the member relative to either the spring arm or the bumper so that the fastening member engages the opening in the energy-absorbing member, impact energies on the bumper may be absorbed and the impact-absorbing characteristic of the combination improved.

13 Claims, 7 Drawing Figures

PATENTED DEC 3 1974  3,851,910

AUTOMOTIVE BUMPER AND ENERGY ABSORBING MEMBER THEREFOR

BACKGROUND OF THE INVENTION

This invention relates to an energy-absorbing member. More particularly, this invention relates to an energy-absorbing member defining an opening for frictionally engaging a laterally translatable member disposed therein. Still more particularly, this invention relates to a combination of such a member with a bumper secured to a spring arm.

It has long been a problem in the art to develop various types of configurations and mechanical devices to absorb or minimize the effect of vibrations, impact and other forms of kinetic energy. In particular, the problem of absorbing or reducing the effect of impact on a vehicle such as an automobile, has become particularly acute both for reasons of safety and because of the cost of repairing vehicles involved in even minor impacts. To this end, vehicles have been provided with various types of bumper arrangements to absorb or minimize the effect of impact on the bumper.

In connection with a bumper system in general, various types of configurations have been developed which have as their general aim the desire to minimize the effect of minor collisions, and to reduce the cost of repair of the bumper system. Thus, in one typical bumper arrangement, the bumper is secured, directly or indirectly, with a spring arm arrangement to the frame of the vehicle. With such a configuration, impact energies on the bumper are, at least in some measure, absorbed by the spring-like action of the spring arm.

When such spring arms are arcuate, the terminal portion of the spring arm may be approximately laterally translatable relative to the bumper and secured thereto by a fastening member, such as a pin. One difficulty with such a construction, however, is the fact that upon even of a minor nature, the securing pin tends to be sheared by the tendency of the edge of the spring arm to be translated relative to the bumper upon impact to the bumper.

Thus, various types of arrangements have been developed in an attempt to absorb further the energies of impact and to minimize the shearing of the fastening member. One convenient arrangement comprises a spring member mounted between a pair of spring arms where the ends of the spring arms are secured in an opening in the bumper so to be laterally translatable to a limited extent. Representative examples of such arrangements are shown in U.S. Pat. Nos. 1,299,315, 1,811,569 and 1,813,517. Other examples of a slideable connection between a spring arm and a bumper are shown in U.S. Pat. Nos. 1,645,561 and 1,808,130.

While arrangements involving a slideable connection have in part been effective at least to some extent because of the frictional engagement between the slideable spring arm and the impact bar, it is a continuing problem in the art to improve such bumper arrangements, as shown, for example, in U.S. Pat. No. 2,031,349. In the latter-mentioned patent, the frictional engagement is apparently improved between a surface of the spring arm and the adjacent surfaces of a bumper by positioning the securing pin in a slot which permits lateral freedom. However, no provisions appear to have been made in the art for engaging the peripheral surfaces of the securing members in slots to enhance the energy-absorbing capabilities of such a combination.

Accordingly, it is a broad object of this invention to provide a member which defines an opening for receiving such a laterally translatable member as the pin member therein, wherein the opening frictionally engages the peripheral surfaces of the pin member.

It is an additional object of this invention to provide such a member having an opening defining opposed surfaces, the distance between which decreases with increasing distance from the position within said opening which conventionally houses such a pin.

It is another object of this invention to provide such a member which increases in thickness with increasing distance from the position in the opening which houses the pin.

It is an additional object of this invention to provide such a member in combination with a bumper system defining an impact bar secured to a spring arm in such a manner that the spring arm is laterally translatable relative to the bumper under impact.

It is an additional object of this invention to provide in such a combination an opening in the spring arm to accommodate the energy-absorbing member according to the invention.

These and other objects of this invention will become apparent from a review of the written description of the invention which follows taken in conjunction with the accompanying drawings.

BRIEF SUMMARY OF THE INVENTION

Directed to overcoming the difficulties in the prior art and achieving at least the aforestated objects, this invention relates to an energy-absorbing member having a predetermined geometric configuration which defines at least a first pair of surfaces and an opening in the member. The opening has a first portion and a second portion wherein the first portion is adapted to receive a translatable member therein, such as the pin securing the spring arm to the bumper. The second portion of the opening defines a second pair of opposed surfaces for frictionally engaging the periphery of the pin to enhance the energy-absorbing characteristics of the member. In one embodiment, the second pair of surfaces converges in proportion to the the distance from the first portion of the opening and such surfaces are linear or curvilinear. Additional openings may be provided in the member to enhance its compressibility and hence its energy-absorbing capabilities.

In another embodiment of the invention, the thickness of the member increases with the distance from the first portion of the opening to accommodate equidistant or variably distant surfaces.

In combination with the bumper and spring arm, the member is positioned in a corresponding opening defined in the end of the spring arm and the combination covered by a cover plate.

Typical of the materials which may be used in the manufacture of the energy-absorbing member when practicing this invention are urethane rubber, wood, and various types of metals, such as aluminum, lead and the like, which materials compress or change shape at least slightly under pressure.

DETAILED DESCRIPTION OF THE INVENTION

Figure 1:
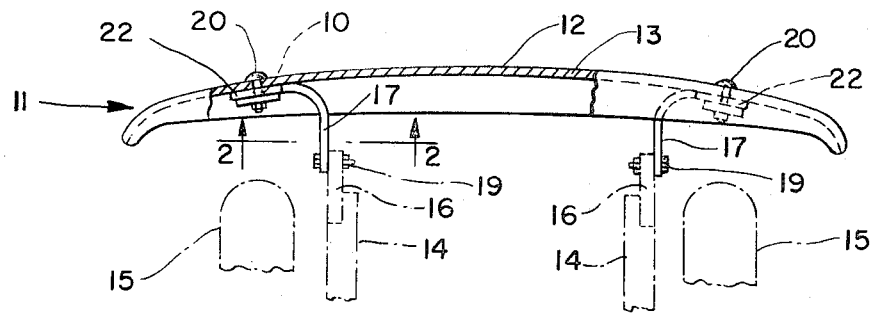
FIG. 1 is a plan view, partially in section and partially in phantom, illustrating a preferred environment for the use of the member according to the invention in combination with an automotive bumper and a spring arm.

In FIG. 1, the energy-absorbing member 10 according to the invention is positioned adjacent a bumper or impact member designated generally by the reference numeral 11 having a generally U-shaped cross section defined by a front impact member 12 and upper and lower laterally-extending flanges 13. The bumpers with which the member of the invention may be used may be any one of a wide variety of shapes.

The bumper 11 is secured to the frame horns 14 (shown in phantom outline relative to the wheels 15, also shown in phantom) of the vehicle by a pair of members 16 respectively secured to the distal ends of a pair of spring arms 17. The end of each of the spring arms 17 is respectively secured to the member 16 by a fastening member 19 and the other ends thereof are secured to the bumper by a fastening member 20. In the embodiment shown in FIG. 1, a pair of identical spring arms are shown, so that like-reference numerals are used, although other spring arm arrangements are within the scope of the combination according to the invention.

With this conventional manner of securing a bumper to a frame where the fastening member reposes in a slot, any impact upon the impact surface 12 of the bumper 11 is dissipated, at least partially, by the spring-like action of the spring arms 17 and the frictional engagement between an outer surface of each of the outer ends 22 of the arms and the inner adjacent surface of the bumper. Such frictional engagement is provided by the tension exerted by the fastening member 20.

Figure 5:
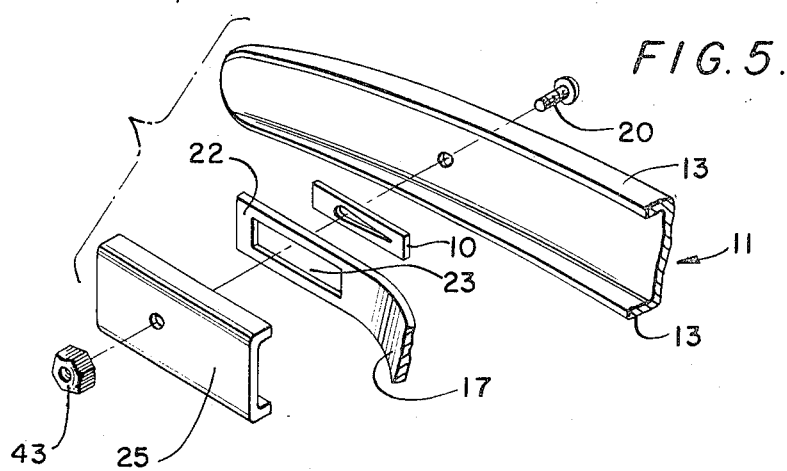
FIG. 5 is an exploded perspective view of the member according to the invention and the components of a combination of the member, spring arm, cover plate and bumper.

As previously indicated, however, such an embodiment tends to shear the pins, even for relatively minor impacts. With the insert 10, according to the invention, positioned in an opening 23 defined in the outer end 22 of the spring arm 17, the shock absorbing capability of the arrangement is enhanced in that the shock is dissipated by the action of the spring, and the action of the surface of the outer end 22 of the spring arm 17 against both the inner surface of the bumper 11 and the outer surface of the retainer plate 25 as previously described. However, additional frictionally engaging opposed surfaces 31 and 32 exist in the opening 30 defined in the insert 10 and engage the peripheral surface of the shank of the fastening member. This coaction of the surfaces 31 and 32 and the shank of the member 20 materially enhances the energy-absorbing capability of the combination. Thus, with an impact on the impact surface 12 of the bumper 11 and when the spring arm tends to slide laterally outwardly relative to the inner surface of the bumper 11, as shown in FIG. 5, the bolt is forced to traverse the opening 30 in such a manner that the shank of the member 20 engages the surfaces 31 and 32 of the insert.

Figure 2:
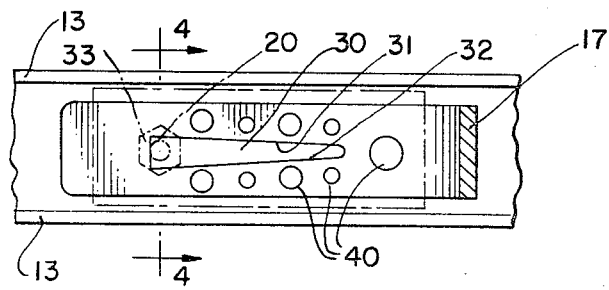
FIG. 2 is a frontal elevational view, partially in section, with the cover plate removed and shown in phantom, taken along line 2—2 of FIG. 1.
Figure 3:
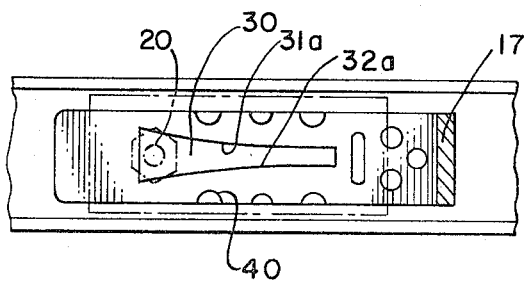
FIG. 3 is a frontal elevational view similar to the view in FIG. 2 showing an alternative embodiment of the member according to the invention.

The insert 10, as seen in FIGS. 2 and 3, is arranged such that the distance between opposed surfaces 31 and 32 of the opening 30 varies proportionally with the length of the distance from the bolt acceptor opening 33 in the opening 30. This arrangement permits additional resistive forces to be exerted on the fastening member 20 under greater impact conditions.

To enhance the compressiblity of the member 10, a plurality of openings 40 may also be provided. The openings 40 may be randomly placed or positioned in a pattern. Various examples of the placement of openings 40 are shown.

FIGS. 2 and 3 illustrate two embodiments of the member. In FIG. 2, the surfaces 31 and 32 of the opening are relatively linear and taper inwardly, whereas the upper and lower surfaces 31a and 32a of the opening 30 as shown in FIG. 3 are curvilinear surfaces. Other configurations of the opening may also be used to engage the shank of the fastening member 20.

Figure 4:
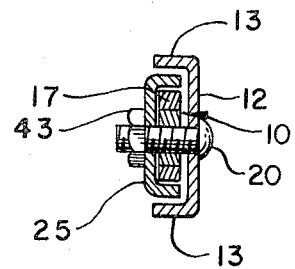
FIG. 4 is a side cross sectional view taken along line 4—4 of FIG. 2 showing the member according to the invention secured within an opening in a spring arm positioned between the cover plate and the bumper.

The overall assembly of the member and the bumper is best seen in FIGS. 4 and 5 wherein the member 20 is inserted in the opening 23 in the end of the spring arm 17. A retainer plate 25, which comprises a generally U-shaped channel member, envelops the end of the spring arm 17 and is secured within the generally U-shaped channel of the bumper 11 by the retaining member 20 secured by the nut 43. Other arrangements may also be used to fixedly position the member 10 relative to either of the spring arm or the bumper.

By way of example, the insert may be made of urethane rubber, various types of metal, such as lead, zinc and the like, hard wood, and the like.

In addition to the additional surfaces which can be frictionally inter-engaged as described above, referring to the surface of the bolts 20, and the opposed surfaces 31 and 32 in the opening 30 of the member 10, the member, because of its material, materially aids the absorption of impact shock because of its compressibility. While the overall compressibility is a function of the material chosen, and whether openings 40 are used or not, the combination of the additional surface and the compressibility of the member will be materially helpful in reducing the incident of sheared pins 20 in minor automotive impact incidents and will be materially helpful in absorbing at least a portion of the impact energy provided in such incidents.

Figure 6:
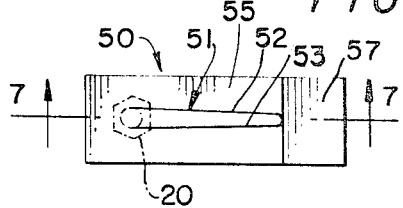
FIG. 6 is a plan view of the member wherein the thickness of the member increases with increasing distance from the first portion of the opening.
Figure 7:
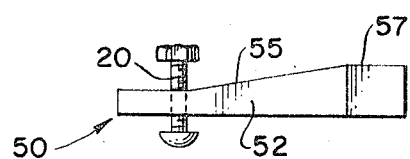
FIG. 7 is a view taken along line 7—7 of FIG. 6.

FIG. 6 illustrates another embodiment of the invention, designated generally by the reference numeral 50 in which the thickness of the member increases with increasing distance from the pin 20. Such a construction imparts an increasing surface area for contact with the member 20 as the member 20 is displaced from its rest position under impact.

The construction of the member 50 comprises a tapered portion 55 spanning the distance between the narrow portion of the member 50 to the thickest portion 57 of the member. In such an embodiment, the opposed surfaces 52 and 53 may be equidistant, or may assume either of the shapes shown in FIGS. 2 and 3.

The invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

What is claimed is:

1. An energy-absorbing member having a predetermined geometrical configuration defining at least a first pair of spaced-apart outer surfaces determining the thickness of said member and an opening in said member extending between and through said first pair of surfaces, said opening having a first portion and a second portion, said first portion adapted to receive a translatable member therein which under a predetermined condition is capable of being translated generally transversely and laterally relative to said first pair of surfaces from said first portion to said second portion of said opening, said second portion of said opening defining a second pair of opposed surfaces for frictionally engaging the periphery of said translatable member to reduce the kinetic energy thereof, said second pair of surfaces extending generally transversely relative to said first pair of surfaces.

2. The member as set forth in claim 1 wherein said second pair of surfaces converge in a direction corresponding to an increasing distance from said first portion.

3. The member as set forth in claim 2 wherein said second pair of surfaces are substantially curvilinear surfaces.

4. The member as set forth in claim 2 wherein said second pair of surfaces are substantially planar.

5. The member as set forth in claim 1 wherein the thickness of said member increases with increasing distance from said first portion of said opening.

6. The member as set forth in claim 1 in combination with said translatable member, said translatable member being secured to a fixed member, said energy-absorbing member being movable relative thereto.

7. The combination set forth in claim 6 wherein said fixed member is a bumper and said translatable member is a securing member and further including a spring arm secured to said bumper by said spring arm.

8. In the combination of a bumper provided with a spring arm secured to said bumper by a fastening member, the improvement comprising:

an energy-absorbing member having a predetermined geometrical configuration defining at least a first pair of spaced-apart outer surfaces determining the thickness of said member and an opening in said member extending between and through said first pair of surfaces, said opening having a first portion and a second portion, said first portion adapted to receive said fastening member therein which under a predetermined condition of impact to said bumper is capable of being translated generally transversely and laterally relative to said first pair of surfaces from said first portion to said second portion of said opening, said opening further defining a second pair of surfaces for frictionally engaging said fastening member to reduce the kinetic energy thereof, said second pair of surfaces extending generally transversely relative to said first pair of surfaces.

9. The combination as set forth in claim 8 wherein said second pair of surfaces converge relative to the distance from said first portion.

10. The combination as set forth in claim 9 further characterized in that said spring arm defines an opening for receiving said energy-absorbing member therein.

11. The combination as set forth in claim 8 further including at least one additional opening in said member so that said energy-absorbing member is compressible to absorb additional energy from said fastening member.

12. An energy-absorbing member having a predetermined geometrical configuration defining at least a first pair of surfaces and an opening in said member having a first portion and a second portion, said first portion adapted to receive a translatable member therein which under a predetermined condition is capable of being translated from said first portion to said second portion of said opening, said second portion of said opening defining a second pair of opposed surfaces for frictionally engaging the periphery of said translatable member to reduce the kinetic energy thereof and further including at least one additional opening in said member so that said energy-absorbing member is compressible to absorb additional energy from said translatable member.

13. In the combination of a bumper provided with a spring arm secured to said bumper by a fastening member, the improvement comprising:

an energy-absorbing member having a predetermined geometrical configuration defining at least a first pair of surfaces and an opening in said member having a first portion and a second portion, said first portion adapted to receive said fastening member therein which under a predetermined condition of impact to said bumper is capable of being translated from said first portion to said second portion of said opening, said opening further defining a second pair of surfaces which converge relative to the distance from said first portion for frictionally engaging said fastening member to reduce the kinetic energy thereof and wherein the thickness of said member increases with increasing distance from said first portion.

* * * * *